United States Patent
Gamlin et al.

(10) Patent No.: US 8,722,747 B2
(45) Date of Patent: May 13, 2014

(54) VESSEL FOR CONTAINING CATALYST IN A TUBULAR REACTOR

(75) Inventors: Timothy Douglas Gamlin, London (GB); Brendon Bruce Miller, London (GB)

(73) Assignee: Davy Process Technology Limited, London (GB)

( * ) Notice: Subject to any disclaimer, the term of this patent is extended or adjusted under 35 U.S.C. 154(b) by 147 days.

(21) Appl. No.: 13/501,794

(22) PCT Filed: Oct. 19, 2010

(86) PCT No.: PCT/GB2010/001931
§ 371 (c)(1),
(2), (4) Date: Jul. 6, 2012

(87) PCT Pub. No.: WO2011/048361
PCT Pub. Date: Apr. 28, 2011

(65) Prior Publication Data
US 2012/0277331 A1    Nov. 1, 2012

(30) Foreign Application Priority Data

Oct. 19, 2009 (GB) .................................. 0918246.0

(51) Int. Cl.
*C07C 27/00* (2006.01)
*B01J 21/00* (2006.01)
*B01J 8/00* (2006.01)

(52) U.S. Cl.
USPC ............................ 518/700; 502/100; 422/651

(58) Field of Classification Search
USPC ............................ 518/700; 502/100; 422/651
See application file for complete search history.

(56) References Cited

FOREIGN PATENT DOCUMENTS

| EP | 1300190 A1 | 4/2003 |
|---|---|---|
| EP | 1623755 A1 | 2/2006 |
| EP | 1818094 A1 | 8/2007 |

OTHER PUBLICATIONS

International Search Report and Written Opinion of PCT/GB2010/001931, mailed Jan. 21, 2011, 8 pages.

*Primary Examiner* — Jafar Parsa
(74) *Attorney, Agent, or Firm* — Armstrong Teasdale LLP

(57) ABSTRACT

In a catalyst carrier for insertion in a tube of a reactor, an annular container holds the catalyst in use and has a perforated inner wall defining a tube, a perforated outer wall, a top surface closing the annular container and a bottom surface closing the annular container. A surface closes the bottom of the tube formed by the inner wall of the annular container. A skirt extends upwardly from the perforated outer wall of the annular container from a position at or near the bottom surface to a position below the location of a seal located at or near the top surface and extending from the container by a distance which extends beyond an outer surface of the skirt.

14 Claims, 3 Drawing Sheets

Detail A

VESSEL FOR CONTAINING CATALYST IN A TUBULAR REACTOR

The present invention relates to a catalyst carrier for use in a tubular reactor. More particularly, it relates to a catalyst carrier for use in a tubular reactor in which an exothermic or an endothermic reaction is to be carried out. Still more particularly, it relates to a catalyst carrier for use in a reactor for carrying out an exothermic or endothermic reaction comprising a plurality of said catalyst carriers.

Tubular reactors comprise tubes, which are usually cylindrical, and which are usually randomly filled with catalyst particles. A heat transfer means will be located outside these tubes. During operation, gas, liquid, or both gas and liquid flows through the tubes over the catalyst particles such that the desired reaction takes place.

For many reactions, the heat effects of the reaction are moderate. In such circumstances large-diameter tubes may be used such that there is a large volume of catalyst across the tube. However, for more exothermic or endothermic reactions it is necessary that there is efficient heat transfer via the tube wall to control the conditions within the reactor. This means that the number of particles of catalyst across the tube and hence the cross-sectional area of the tube must be reduced.

Tubular reactors in which moderate to highly exothermic reactions take place are in many cases heat transfer limited. One disadvantage of this is that the benefits of more active catalysts are difficult to realise since the increased productivity generates increased amounts of heat which must be removed at a rate that maintains a stable operating temperature and thus avoid thermal runaway. Where the reaction is a moderate to highly endothermic reaction, problems can arise with increased heating and in some systems damage to the tube wall can occur.

Known reactors have a number of drawbacks that make them less than ideal. One problem that is noted for these reactors is that in order to extract the heat of reaction effectively the tubes have to be relatively small in diameter to ensure that the centre line of the tube remains cool enough to avoid thermal runaway in an exothermic reaction or quenching in an endothermic reaction. Since the tubes have to be relatively small, generally of the order of 15 to 40 mm internal diameter, this significantly increases the number and hence weight of the tubes in the reactor needed to contain a specific catalyst volume and thus limits the productivity of a single reactor of reasonable shipping dimensions and weight.

A second problem is that the catalyst particles have to be a certain size and shape and strength so as not to cause an undue pressure drop for an appropriate tube length and in general this leads to the use of larger catalyst particles. This in itself may be problematic where the reaction is mass or heat transfer limited, or both. Whilst some of these problems may be alleviated by ensuring that the active sites are only present near the surface of the catalyst particle, this can limit the productivity that can be achieved since the available active sites have to be worked harder to deliver a reasonable overall productivity which can reduce the life of the catalyst.

It is therefore desirable to provide a means of using larger cross-sectional area tubes with powdered or high surface area structured or foamed catalysts operating at high productivities which therefore have high heat output while maintaining long tubes, of the order of 20 m, and an acceptable pressure drop.

The present invention solves the above problems by the provision of a catalyst carrier device which is configured to sit within the reactor tube and which in use optimises heat transfer at the tube wall such that larger tubes can be used with larger volumes of smaller catalyst particles and such that the reactor can be operated at high productivity even in exothermic or endothermic reactions, and with an acceptable pressure drop.

Thus according to the present invention there is provided a catalyst carrier for insertion in a tube of a tubular reactor, said catalyst carrier comprising:
  an annular container for holding catalyst in use, said container having a perforated inner wall defining a tube, a perforated outer wall, a top surface closing the annular container and a bottom surface closing the annular container;
  a surface closing the bottom of said tube formed by the inner wall of the annular container;
  a skirt extending upwardly from the perforated outer wall of the annular container from a position at or near the bottom surface of said container to a position below the location of a seal; and
  a seal located at or near the top surface and extending from the container by a distance which extends beyond an outer surface of the skirt.

For the avoidance of doubt, any discussion of orientation, for example terms such as upwardly, below, lower, and the like have, for ease of reference been discussed with regard to the orientation of the catalyst carrier as illustrated in the accompanying drawings. However, the catalyst carrier of the present invention could also be used in an alternative orientation for example horizontally. Thus the terms should be constructed accordingly.

The container will generally be sized such that it is of a smaller dimension than the internal dimension of the reactor tube into which it is to be placed in use. The seal will be sized such that it interacts with the inner wall of the reactor tube when the catalyst carrier of the present invention is in position within the tube. Parameters such as carrier length and diameter will be selected to accommodate different reactions and configurations.

In use in a vertical reactor with downflow, reactant(s) flow downwardly through the tube and thus first contacts the upper surface of the catalyst carrier. Since the seal blocks the passage of the reactant(s) around the side of the container, the top surface thereof directs them into the tube defined by the inner perforated wall of the container. The reactant(s) then enters the annular container through the perforated inner wall and then passes radially through the catalyst bed towards the perforated outer wall. During the passage from the inner wall to the outer wall, the reactant(s) contact the catalyst and reaction occurs. Unreacted reactant and product then flow out of the container though the perforated outer wall. The upwardly extending skirt then directs reactant and product upwardly between the inner surface of the skirt and the outer wall of the annular container until they reach the seal. They are then directed, by the underside of the seal, over the end of the skirt and flow downwardly between the outer surface of the skirt and the inner surface of the reactor tube where heat transfer takes place.

It will be understood that where the reactor is an upflow reactor or is for example in a horizontal orientation, the flow path will differ from that described above. However the principle of the path through the container will be as described.

Generally, a plurality of catalyst carriers will be stacked within a reactor tube. In this arrangement, the reactants/products flow downwardly between the outer surface of the skirt of a first carrier and the inner surface of the reactor tube until they contact the upper surface and seal of a second carrier and are directed downwardly into the tube of the second carrier defined by the perforated inner wall of its annular container. The flow path described above is then repeated.

The catalyst carrier may be formed of any suitable material. Such material will generally be selected to withstand the operating conditions of the reactor. Generally, the catalyst carrier will be fabricated from carbon steel, aluminum, stainless steel, other alloys or any material able to withstand the reaction conditions.

The wall of the annular container can be of any suitable thickness. Suitable thickness will be of the order of about 0.1 mm to about 1.0 mm, preferably of the order of about 0.3 mm to about 0.5 mm.

The size of the perforations in the inner and outer walls of the annular container will be selected such as to allow uniform flow of reactant(s) and product(s) through the catalyst while maintaining the catalyst within the container. It will therefore be understood that their size will depend on the size of the catalyst particles being used. In an alternative arrangement the perforations may be sized such that they are larger but have a filter mesh covering the perforations to ensure catalyst is maintained within the annular container. This enables larger perforations to be used which will facilitate the free movement of reactants without a significant loss of pressure.

It will be understood that the perforations may be of any suitable configuration. Indeed where a wall is described as perforated all that is required is that there is means to allow the reactants and products to pass through the walls. These may be small apertures of any configuration, they may be slots, they may be formed by a wire screen or by any other means of creating a porous or permeable surface.

Although the top surface closing the annular container will generally be located at the upper edge of the or each wall of the annular container, it may be desirable to locate the top surface below the upper edge such that a portion of the upper edge of the outer wall forms a lip. Similarly, the bottom surface may be located at the lower edge of the, or each, wall of the annular container or may be desirable to locate the bottom surface such that it is above the bottom edge of the wall of the annular container such that the wall forms a lip.

The bottom surface of the annulus and the surface closing the bottom of the tube may be formed as a single unit or they may be two separate pieces connected together. The two surfaces may be coplanar but in a preferred arrangement, they are in different planes. In one arrangement, the surface closing the bottom of the tube is in a lower plane than the bottom surface of the annular container. This serves to assist in the location of one carrier on to a carrier arranged below it when a plurality of containers are to be used. It will be understood that in an alternative arrangement, the surface closing the bottom of the tube may be in a higher plane that the bottom surface of the annular container.

Whilst the bottom surface will generally be solid, it may include one or more drain holes. Where one or more drain holes are present, they may be covered by a filter mesh.

Similarly a drain hole, optionally covered with a filter mesh may be present in the surface closing the bottom of the tube. Where the carrier is to be used in a non-vertical orientation, the drain hole, where present will be located in an alternative position i.e. one that is the lowest point in the carrier when in use.

One or more spacer means may extend downwardly from the bottom surface of the annular container. The, or each, spacer means may be formed as separate components or they may be formed by depressions in the bottom surface. Where these spacer means are present they assist in providing a clear path for the reactants and products flowing between the bottom surface of the first carrier and the top surface of a second lower carrier in use. The spacer may be of the order of about 4 mm to about 6 mm deep. Alternatively, or additionally, spacer means may be present on the top surface.

The top surface closing the annular container may include on its upper surface means to locate the container against a catalyst carrier stacked above the container in use. The means to locate the container may be of any suitable arrangement. In one arrangement it comprises an upstanding collar having apertures or spaces therein to allow for the ingress of reactants.

The upwardly extending skirt may be smooth or it may be shaped. Any suitable shape may be used. Suitable shapes include pleats, corrugations, and the like. The pleats, corrugations and the like will generally be arranged longitudinally along the length of the carrier. The shaping of the upstanding skirt increases the surface area of the skirt and assists with the insertion of the catalyst carrier into the reaction tube since it will allow any surface roughness on the inner surface of the reactor tube or differences in tolerances in tubes to be accommodated.

Where the upwardly extending skirt is shaped, it will generally be flattened to a smooth configuration towards the point at which it is connected to the annular container to allow a gas seal to be formed with the annular container. The upstanding skirt will generally be connected to the outer wall of the annular container at or near the base thereof. Where the skirt is connected at a point above the bottom of the wall, the wall will be free of perforations in the area below the point of connection. The upstanding skirt may be flexible.

Generally, the upstanding skirt will stop at about 0.5 cm to about 1.5 cm, preferably about 1 cm, short of the top surface of the annular container.

Without wishing to be bound by any theory, it is believed that the upstanding skirt serves to gather the reactants/products from the perforated outer wall of the annular container and direct them via the shapes towards the top of the catalyst carrier collecting more reactants/products exiting from the outer wall of the annular container as they move upwardly. As described above, reactants/products are then directed down between the tube wall and the outside of the upstanding skirt. By this method the heat transfer is enhanced down the whole length of the carrier but as the heat exchange is separated from the catalyst, hotter or colder as appropriate heat exchange fluid can be used without quenching the reaction at the tube wall and at the same time ensuring that the temperature of the catalyst towards the centre of the carrier is appropriately adjusted.

The seal may be formed in any suitable manner. However, it will generally be sufficiently compressible to accommodate the smallest diameter of the reactor tube. The seal will generally be a flexible, sliding seal. In one arrangement, an O-ring may be used. A compressible split ring or a ring having a high coefficient of expansion could be used. The seal may be formed of any suitable material provided that it can withstand the reaction conditions. In one arrangement, it may be a deformable flange extending from the carrier. The flange may be sized to be larger than the internal diameter of the tube such that as the container is inserted into the tube it is deformed to fit inside and interact with the tube.

One advantage of the present invention is that catalyst can be provided to the user within the carriers of the present invention which can then be readily installed within the reactor tubes with minimum downtime. Thus catalyst may be loaded into the catalyst carrier at the catalyst manufacturing site. It may be pre-reduced and stabilised or encapsulated obviating the need for catalyst handling on site. Once the catalyst is spent, the carriers can be readily removed from the reactor as discrete units and readily transported for disposal or regeneration as appropriate.

A further advantage of the present invention is that the problems noted in prior art arrangements in ensuring that each tube of a tubular reactor are equally filled are obviated.

The catalyst carrier of the present invention allows the use of highly granular or structured catalysts in medium to highly exothermic or endothermic reactions. The device allows the use of large tubes leading to large weight and cost reductions for a reactor of a given capacity since heat transfer effectively takes place in a micro-channel zone at the tube wall. This gives excellent heat transfer to or from the cooling/heating medium. Furthermore, as the catalyst is separated from the cooling/heating medium, a larger temperature difference can be allowed as the heat exchange effect is separated from the reaction. Where a plurality of carriers of the present invention is inserted into a tube this effectively provides a plurality of adiabatic reactors in series in each tube.

The catalyst carrier may be used in a wide range of processes. Examples of suitable processes include reactors for exothermic reactions such as reactions for the production of methanol, reactions for the production of ammonia, methanation reactions, shift reactions, oxidation reactions such as the formation of maleic anhydride and ethylene oxide, Fischer-Tropsch reactions, and the like. Endothermic reactions such as pre-reforming, dehydrogenation and the like can be carried out in reactors including the catalyst carriers of the present invention.

The catalyst carrier of the present invention may be filled or partially filled with any suitable catalyst.

According to a second aspect of the present invention there is provided a reactor tube comprising a plurality of catalyst carriers of the above-mentioned first aspect of the present invention.

According to a third aspect of the present invention there is provided a reactor comprising one or more of the reactor tubes of the above second aspect.

According to a fourth aspect of the present invention there is provided a process for carrying out a reaction wherein the reactants enter into a catalyst carrier of the above first aspect, a reactor tube of the above second aspect, or a reactor of the above third aspect.

The flow of reactants through the catalyst bed is preferably radial.

The catalyst carriers of the present invention allow longer reactor tubes to be used than has been possible heretofore.

The present invention will now be described, by way of example, with reference to the accompanying drawings in which.

Figure 1:
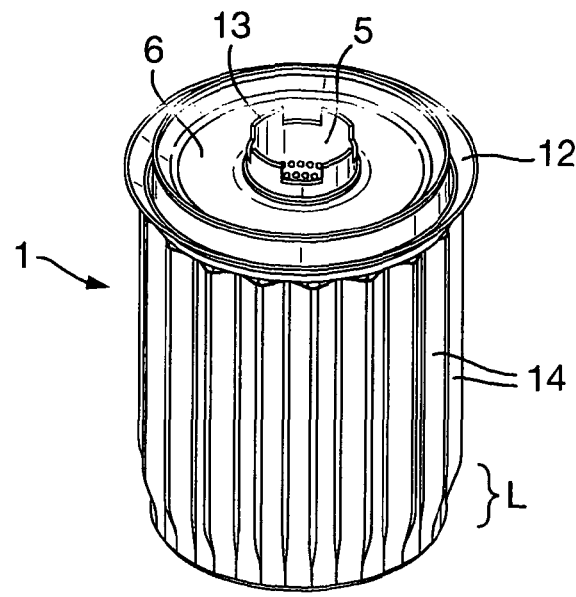
FIG. 1 is a perspective view from above of the catalyst carrier of the present invention.
Figure 2:
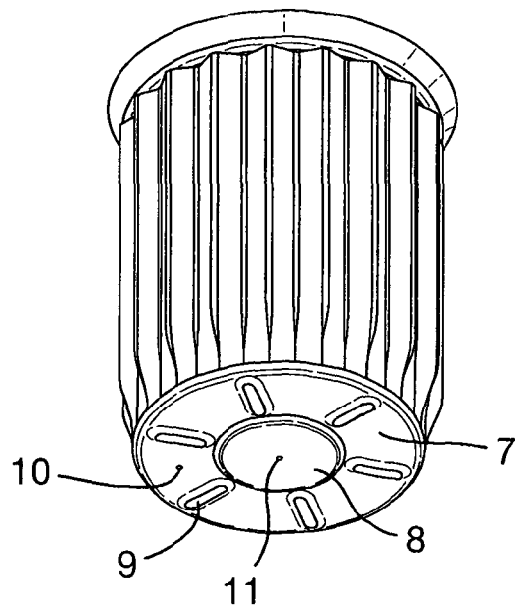
FIG. 2 is a perspective view of the catalyst carrier from below.
Figure 3:
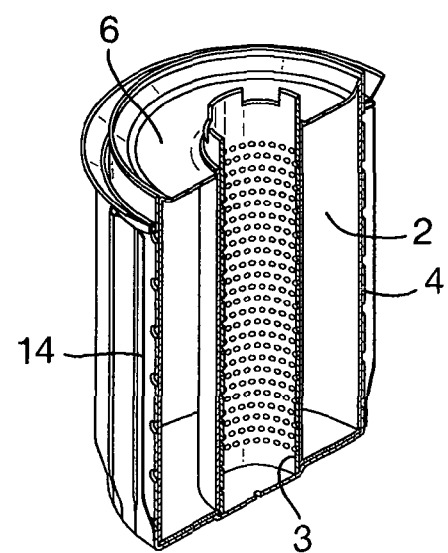
FIG. 3 is a partial cross section viewed from the side.

A catalyst carrier 1 of the present invention is illustrated in FIGS. 1 to 3. The carrier comprises an annular container 2 which has perforated walls 3, 4. The inner perforated wall 3 defines a tube 5. A top surface 6 is closes the annular container at the top. It is located at a point towards the top of the walls 3, 4 of the annular container 2 such that a lip 6 is formed. A bottom surface 7 closes the bottom of the annular container 2 and a surface 8 closes the bottom of tube 5. The surface 8 is located in a lower plane that that of the bottom surface 7. Spacer means in the form of a plurality of depressions 9 are located present on the bottom surface 7 of the annular container 2. Drain holes 10, 11 are located on the bottom surface 7 and the surface 8.

A seal 12 extends from the upper surface 6 and an upstanding collar 13 is provided coaxial with the tube 5.

A corrugated upstanding skirt 14 surrounds the container 2. The corrugations are flattened in the region L towards the base of the carrier 1.

Figure 4:
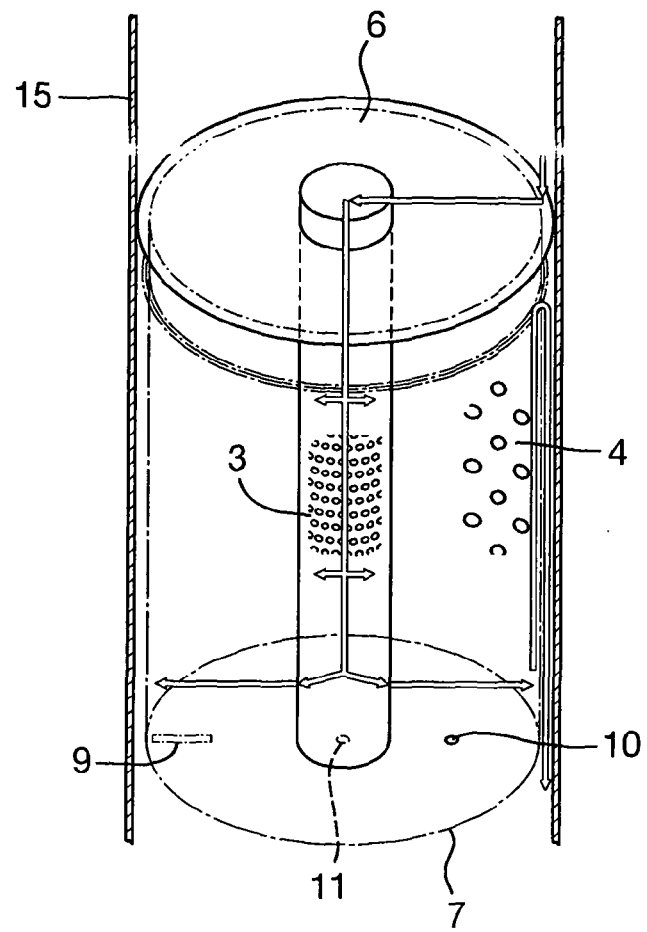
FIG. 4 is a simplified diagram of the catalyst carrier of the present invention.
Figure 5:
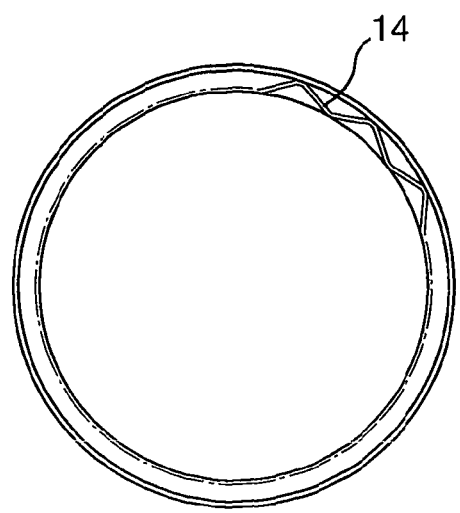
FIG. 5 is a schematic illustration of a carrier of the present invention from below when located within a tube.

A catalyst carrier 1 of the present invention located in a reactor tube 15. The flow of gas is illustrated schematically in FIG. 4 by the arrows.

Figure 6:
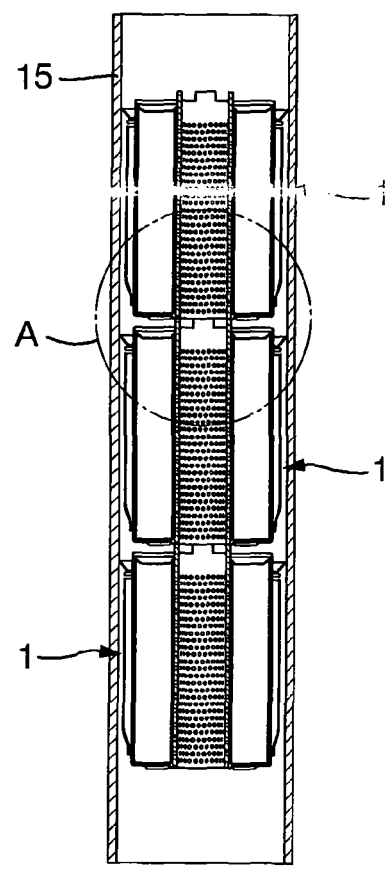
FIG. 6 is a schematic cross section of three catalyst carriers located within a tube.
Figure 7:
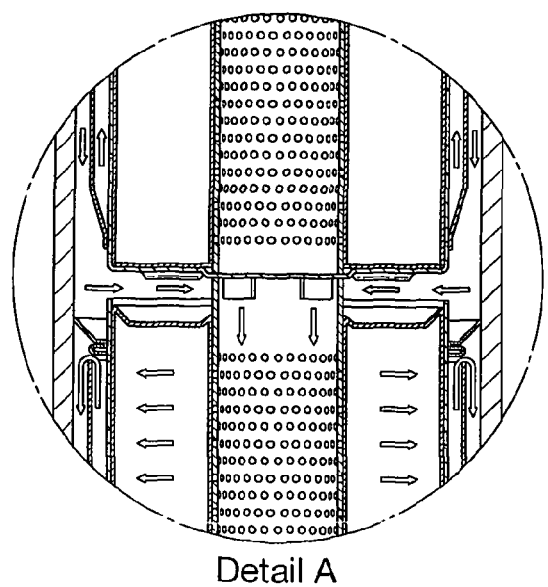
FIG. 7 is an enlarged cross-section of Section A of FIG. 6.

When a plurality of catalyst carriers of the present invention are located within a reactor tube 15 they interlock as illustrated in FIGS. 6 and 7. The effect on the flow path is illustrated in the enlarged section shown in FIG. 7.

The principle of the present invention will now be described by way of illustration using a simplified comparison.

Comparing a tubular reactor with and without the present invention for the same amount of catalyst and overall tube length, the conventional reactor may need 12 tubes of 25 mm internal diameter to hold the same amount of catalyst as a single 100 mm internal diameter tube containing catalyst in catalyst carriers of the present invention (after allowing for the loss of volume for catalyst within the carriers).

Approximately the same amount of heat will be generated or required so the larger tube will have to transmit this heat at a higher rate per unit of tube surface area.

The 12 tubes of 25 mm internal diameter have a surface area three times the surface area of a single tube of 100 mm internal diameter. The high heat transfer rate induced in the micro channel zone at the tube wall compensates for this reduced area.

It will be understood that whilst the catalyst carrier has been described with particular reference to a use in a tube of circular cross-section the tube may be of non-circular cross-section for example, it may be a plate reactor. Where the tube is of non-circular cross-section, the carrier will be of the appropriate shape. In this arrangement, the annulus will not be a circular ring and this term should be constructed accordingly.

The invention claimed is:

1. A catalyst carrier for insertion in a tube of a tube reactor, said catalyst carrier comprising:
    an annular container for holding catalyst in use, said container having a perforated inner wall defining a tube, a perforated outer wall, a top surface closing the annular container and a bottom surface closing the annular container;
    a surface closing the bottom of said tube formed by the inner wall of the annular container;
    a skirt extending upwardly from the perforated outer wall of the annular container from a position at or near the bottom surface of said container to a position below the location of a seal; and
    a seal located at or near the top surface and extending from the container by a distance which extends beyond an outer surface of the skirt.

2. The catalyst carrier according to claim 1 wherein one or more drain holes is located in the bottom surface.

3. The catalyst carrier according to claim 1 wherein one or more drain holes is located in the surface closing the bottom of the tube.

4. The catalyst carrier according to claim 1 wherein one or more spacer means extend downwardly from the bottom surface of the annular container.

5. The catalyst carrier according to claim 1 wherein upper surface closing the annular container include means to locate the container against a catalyst carrier stacked above the container in use.

6. The catalyst carrier according to claim 1 wherein the upwardly extending skirt is shaped.

7. The catalyst carrier according to claim 6 wherein the shaping on the upwardly extending skirt is corrugations.

8. The catalyst carrier according to claim 6 wherein the shaping of the upwardly extending skirt is flattened to a smooth configuration towards the point at which it is connected to the annular container.

9. The catalyst carrier according to claim 1 including catalyst.

10. A reactor tube comprising a plurality of catalyst carriers of claim 1.

11. A reactor including one or more reactor tubes Of claim 10.

12. A process for carrying out a reaction wherein the reactants enter into the catalyst carrier of claim 1.

13. The process according to claim 12 wherein the reactants pass radially through a catalyst bed.

14. The process according to claim 12 wherein the reaction is one of an exothermic reaction and an endothermic reaction.

* * * * *